(12) United States Patent
Bergqvist et al.

(10) Patent No.: US 11,430,234 B2
(45) Date of Patent: Aug. 30, 2022

(54) METHOD OF AUTHENTICATION USING SURFACE PAPER TEXTURE

(71) Applicant: COLOP Digital GmbH, Wels (AT)

(72) Inventors: Johan Bergqvist, Zug (CH); Erik Bohlin, Bromma (SE); Nikolaus Frank, Enskede (SE)

(73) Assignee: COLOP Digital GmbH, Wels (AT)

( * ) Notice: Subject to any disclaimer, the term of this patent is extended or adjusted under 35 U.S.C. 154(b) by 10 days.

(21) Appl. No.: 16/734,675

(22) Filed: Jan. 6, 2020

(65) Prior Publication Data

US 2020/0250422 A1  Aug. 6, 2020

Related U.S. Application Data

(63) Continuation of application No. 15/550,549, filed as application No. PCT/EP2016/051259 on Jan. 21, 2016, now abandoned.

(30) Foreign Application Priority Data

Feb. 13, 2015  (CH) .......................... 189/15

(51) Int. Cl.
*G06V 20/80*  (2022.01)
*G07D 7/2033*  (2016.01)
(Continued)

(52) U.S. Cl.
CPC ............ *G06V 20/80* (2022.01); *G06V 30/224* (2022.01); *G06V 40/40* (2022.01); *G07D 7/202* (2017.05);
(Continued)

(58) Field of Classification Search
None
See application file for complete search history.

(56) References Cited

U.S. PATENT DOCUMENTS 7,806,322 B2  10/2010  Brundage et al.
9,230,383 B2   1/2016  Tian et al.
(Continued)

FOREIGN PATENT DOCUMENTS

CN    103914858 A    7/2014
WO   2014/163014 A1  10/2014

OTHER PUBLICATIONS

Wong CW, Wu M. Counterfeit detection using paper PUF and mobile cameras. In2015 IEEE International Workshop on Information Forensics and Security (WIFS) Nov. 16, 2015 (pp. 1-6). IEEE. (Year: 2015).*

(Continued)

*Primary Examiner* — Michelle M Entezari
(74) *Attorney, Agent, or Firm* — Paul D. Bianco; Stephen Bongini; Fleit Intellectual Property Law

(57) ABSTRACT

A method of authentication using surface paper texture includes steps of capturing a topographic pattern image of a surface of a region of interest of the paper artifact and extracting a plurality of specific features from the captured topographic pattern image. The method further identifies the location of the specific features of the paper artifact from the captured topographic pattern image. A bit map of the identified location of the specific features is generated. Then, a reference image of a reference bit map printed on the region of interest of the paper artifact is captured. Finally, the method compares the generated bit map with the captured reference bit map to generate a score. The score of the comparison determines the level of authentication. The method provides an offline method of authentication.

20 Claims, 4 Drawing Sheets

(51) Int. Cl.
*G07D 7/202* (2016.01)
*G06V 30/224* (2022.01)
*G06V 40/40* (2022.01)
*G07D 7/0043* (2016.01)
*G07D 7/12* (2016.01)

(52) U.S. Cl.
CPC ......... *G07D 7/2033* (2013.01); *G07D 7/0043* (2017.05); *G07D 7/12* (2013.01)

(56) References Cited

U.S. PATENT DOCUMENTS

| | | | |
|---|---|---|---|
| 9,542,752 | B2 | 1/2017 | Tian et al. |
| 10,083,370 | B2 | 9/2018 | Ishiyama |
| 10,089,478 | B1 | 10/2018 | Fraser |
| 2001/0037455 | A1* | 11/2001 | Lawandy ............... G06K 19/14 713/176 |
| 2005/0063562 | A1 | 3/2005 | Brunk |
| 2008/0173832 | A1* | 7/2008 | Chien .................... G07D 7/121 250/556 |
| 2010/0158377 | A1 | 6/2010 | Cowburn |
| 2011/0096955 | A1* | 4/2011 | Voloshynovskiy ..... G07F 7/086 382/103 |
| 2012/0183180 | A1* | 7/2012 | Sun ......................... G06K 9/00 382/108 |
| 2012/0327450 | A1 | 12/2012 | Sagan |
| 2013/0256534 | A1* | 10/2013 | Micheels ........... G01N 21/3577 250/339.07 |
| 2014/0201094 | A1* | 7/2014 | Herrington .......... G06Q 30/018 705/317 |
| 2015/0286855 | A1 | 10/2015 | Neskovic |
| 2016/0055398 | A1 | 2/2016 | Ishiyama |
| 2017/0191946 | A1* | 7/2017 | Smith ...................... G07D 7/12 |

OTHER PUBLICATIONS

First Examination Report dated Feb. 9, 2021 in corresponding Indian Patent Application No. 201727032285 (6 pages).
GS Spagnolo et al., "Currency verification by a 2D infrared barcode", vol. 21, Measurement Science and Technology, 2010, 6 pages.
Giuseppe Schirripa Spagnolo et al "Banknote security using a biometric-like technique: a hylemetric approach; Banknote security using a biometric-like technique", vol. 21, No. 5, May 1, 2010, 8 pages, Measurement Science and Technology.
Ashlesh Sharma et al, "PaperSpeckle: Microscopic Fingerprinting of Paper", Oct. 17, 2011, pp. 99-110, Computer and Communications Security, ACM.
International Search Report dated Apr. 11, 2016 for PCT/EP2016/051259, filed Jan. 21, 2016.
Written Opinion for PCT/EP2016/051259, filed Jan. 21, 2016.
International Preliminary Report on Patentability dated Aug. 15, 2017 for PCT/EP2016/051259, filed Jan. 21, 2016.

* cited by examiner

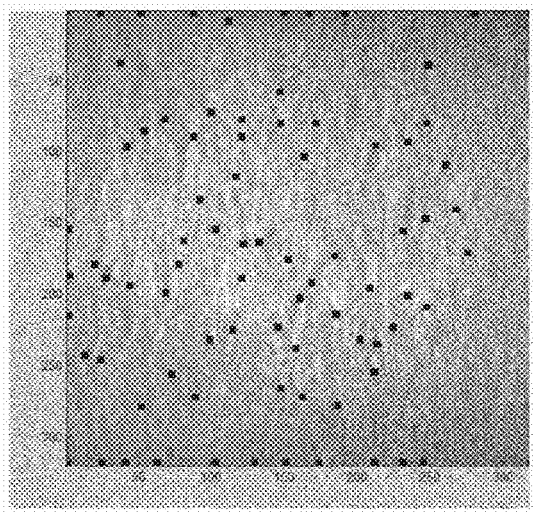
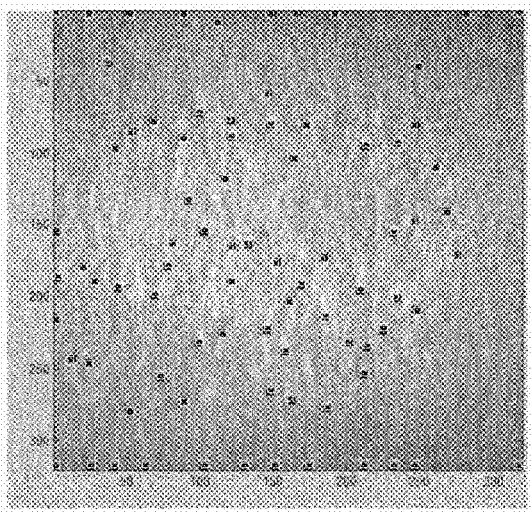
Figure 5a Figure 5b
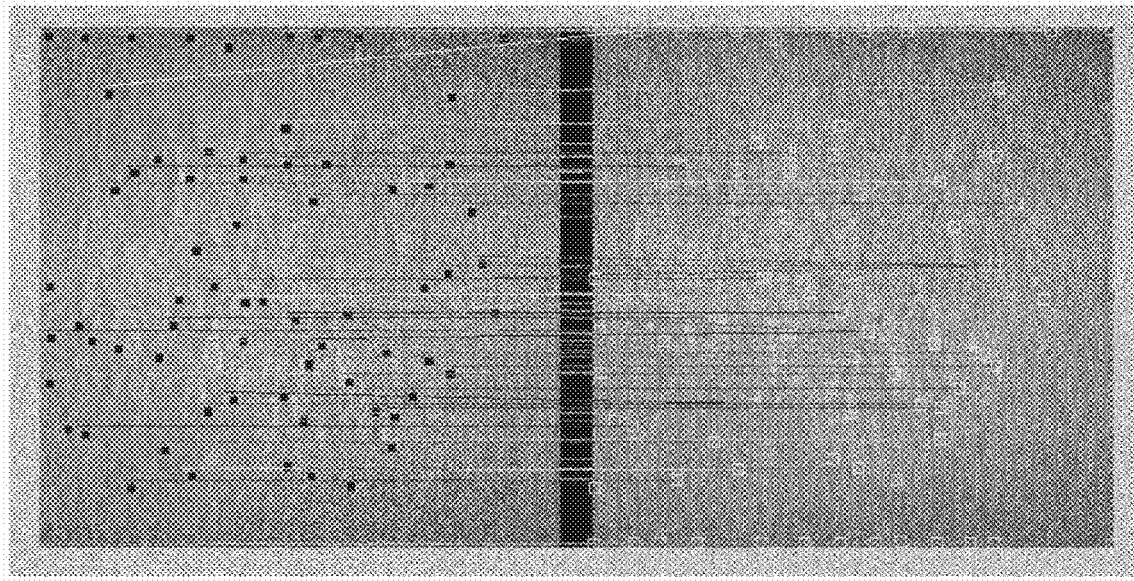
Figure 6a Figure 6b

METHOD OF AUTHENTICATION USING SURFACE PAPER TEXTURE

FIELD OF THE INVENTION

The present invention relates to the field of object authentication and, more specifically, relates to a method of authentication, of paper-based artifact; wherein the method utilizes the topographic pattern image on the surface of a paper-based artifact for offline authentication.

BACKGROUND

Authentication methodologies have been used and applied mostly within the field of biometric authentication. The need to authenticate humans has been around for a long time. The events that trigger such need vary from financial transactions to entering into a foreign country, voting, giving an exam, starting up a company, etc. Biometric authentication methods use the inherent and unique characteristics of individuals. Fortunately, human beings consist of complex organic systems that have high degrees of uniqueness. The most common organic feature utilized for authentication purposes has been fingerprints. More advanced methods can use the iris of the human eyes, blood vessel patterns hidden under the skin of the hand and the face. Other methods involve the use of voice. Most of these methods are based on image processing and recognition. These are possible because of the great diversity of features in the human body.

However, in a plain document or a common package, such great diversity does not exist. As a matter of fact, two documents or two packages of the same size look completely identical to one another at the first sight. With naked eye, there is no obvious alternative to differentiate two identical documents if there are no specific marks printed or written on them.

However, there is a less obvious although extremely robust alternative to differentiate not only apparently identical sheets of paper or packages but also small specific areas within the same paper sheet or the same package.

It is known through various research studies and through existing inventions in the same field, that the inherent microstructure of paper-pulp based product, is so unique that a couple of square centimeters have enough details to be able to create a very robust authentication methodology. There are many prior arts which utilize the paper surface texture for authentication of products but most of them use online method of authentication. The existing offline method of authentication does not make use of paper surface texture.

The U.S. Pat. No. 7,806,322 discloses an authentication method generally related to steganography and digital watermarking. The method includes receiving an object including a host object and auxiliary data steganographically embedded within the host object; determining geometric characteristics of the host object relative to expected geometric characteristics of the host object; and detecting the auxiliary data from the host object. The method can further include re-aligning or correcting geometric characteristics of the object based on a result of the act of determining prior to the act of detecting. This method does not use paper surface texture.

The WIPO Patent Application 2014163014A1 discloses an information acquisition/identification system provided with an image-feature storing means, an extracting means, an acquiring means, and an identifying means. The image-feature storing means stores image features of texture patterns formed on components or products. The extracting means extracts an information-label image and a texture-pattern image from a taken image containing at least the following: an information label that displays information regarding a component, a product, or a product comprising said component; and a texture pattern formed on said component or product. The acquiring means acquires, from the extracted information-label image, the aforementioned information regarding the component or product. The identifying means identifies the component, product, or component-comprising product by matching image features of the extracted texture-pattern image against the image features stored by the image-feature storing means. This invention needs the images to be stored in a data base for comparison.

Hence, there is a need for an offline authentication method utilizing the topographic pattern on the surface of the paper artifact, wherein the method of authentication is cost effective and provides accurate authentication.

SUMMARY

The invention provides a method for authentication of paper-based artifact; wherein the method utilizes the topographic pattern image on the surface of a paper-based artifact for offline authentication. The method of authentication is cost effective and gives great accuracy in authentication over the existing technology.

According to an embodiment, the invention discloses a method of generating an authentication mark on a paper artifact. The method includes steps of scanning a region of interest of the paper artifact to capture the topographic pattern image of the region of interest. The method also includes a step of extracting a plurality of specific features from the captured topographic pattern image. The method further has a step of identifying the location of each specific feature from the captured topographic pattern image. The method also has a step of generating a bit map of the identified location of the specific features.

According to another embodiment, the method further includes a step of printing the generated bit map directly on top of at least one of the regions of interest or any other location. The specific features of the captured topographic pattern image include at least one of a valley, hill or bend of the topographic pattern.

According to another embodiment, the method also includes a step of printing a barcode on the region of interest or in a near-by location. The said barcode might content additional information such as product information into which the authentication mark has been applied or encrypted or scrambled information of any kind.

According to another embodiment, the invention discloses a method of authenticating a paper artifact. The method includes step of capturing a topographic pattern image of a region of interest of the paper artifact. The method also includes step of extracting the specific features from the captured topographic pattern image. The method further performs a step of identifying the location of the specific features from the captured topographic pattern image. The method also includes a step of generating a bit map of the identified location of the specific features. The method further captures the bit map printed on the region of interest of the object and then compares the generated bit map with the captured bit map.

According to another embodiment, the authentication is based on the score generated after comparing the generated bit map with the captured bit map. The method further includes a step of scanning the barcode printed on the region of interest or near-by. The image of the bitmap and the topographic pattern is captured by means of light of different wave lengths.

The present invention provides an offline method of authentication of paper artifact, which may be used for authenticating various article or products or documents. The method of authentication is cost effective and provides accurate authentication. The present invention helps in checking the counterfeit to a great extend.

BRIEF DESCRIPTION OF THE DRAWINGS

The foregoing and other features of embodiments will become more apparent from the following detailed description of embodiments when read in conjunction with the accompanying drawings. Elements in the figures have not necessarily been drawn to scale in order to enhance their clarity and improve understanding of these various elements and embodiments of the invention. Thus, in the interest of clarity and conciseness, the drawings are generalized in form, wherein:

FIG. 5a illustrates a region of the paper artifact with a bit map printed on the surface, in accordance with an embodiment of the invention.

FIG. 5b illustrates a reference bit map image captured from the region of interest, in accordance with an embodiment of the invention.

FIGS. 6a and 6b illustrates how comparison is done between each bit of the captured reference bit map image and the generated bit map, in accordance with an embodiment of the invention.

DETAILED DESCRIPTION

In the following detailed description, reference is made to the accompanying drawings that form a part hereof, and in which is shown by way of illustration specific embodiments that may be practiced. These embodiments are described in sufficient detail to enable a person skilled in the art to practice the invention, and it is to be understood that other embodiments may be utilized and that logical, mechanical, and other changes may be made within the scope of the embodiments. The following detailed description is, therefore, not be taken as limiting the scope of the invention, but instead the invention is to be defined by the appended claims.

The present invention discloses a method for authentication of a paper artifact, which utilizes a topographic pattern image of the microstructure of the paper artifact. The topographic pattern image of the microstructure of the paper-based artifacts is used for offline authentication of the paper-based artifacts. The term paper artifacts include paper as well as paper based artifacts.

Figure 1:
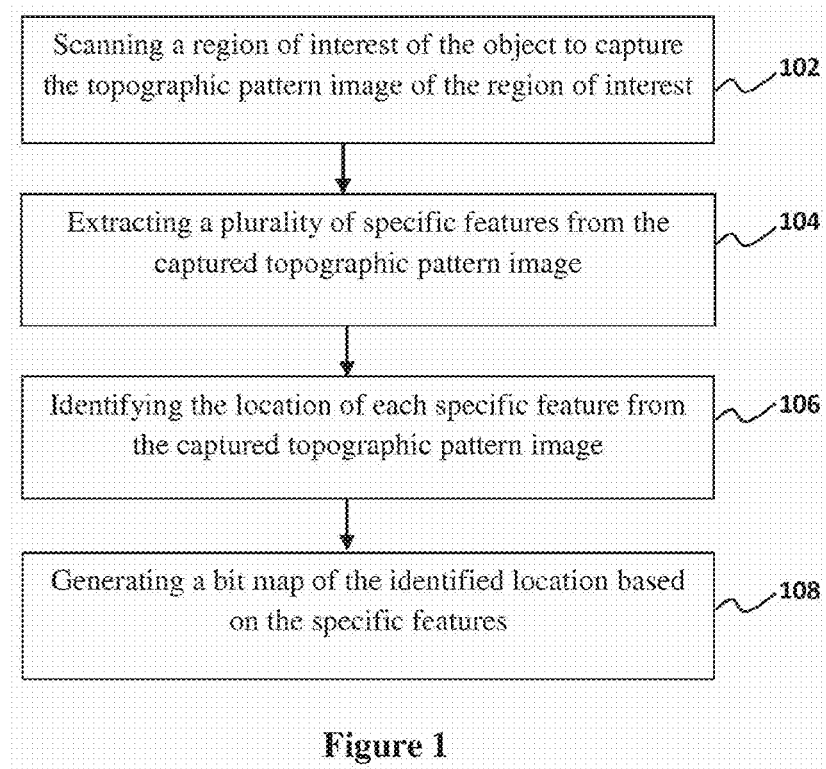
FIG. 1 illustrates a block diagram of the method of generating an authentication mark on a paper artifact, in accordance with an embodiment of the invention.

FIG. 1 illustrates a block diagram of the method of generating an authentication mark on a paper artifact, in accordance with an embodiment of the invention. The method includes the step (102) of scanning a region of interest of the paper artifact to capture the topographic pattern image of the region of interest. The topographic pattern image has the surface microstructure of the paper artifact. The surface microstructure is visible when the light rays falls on the surface of the paper artifact at an angle. The topographic pattern image of the region of interest is captured by the device which is capable of capturing such image. The region of interest may be any region on the surface of the paper artifact for which the authentication mark gets generated. Once the topographic pattern image is captured, then the next step (104) is to extract specific features of the region of interest. The specific features are based on the bends of hills and valleys formed on the image captured as the light falls on the paper artifact at particular angle based on the device used for capturing the topographic image. The hills and valleys are formed based on the angle in which the light source of the encoder/decoder strikes the paper surface as shadows are casted by the fibers in the paper surface. The encoder along with a printer is used for generating the authentication mark, where as a decoder is used for authenticating the paper artifact. The decoder may include an encoder also. Once the features are specifically extracted then the next step (106) is identification of the location of each of the specific features from the captured topographic pattern image. For a particular region of interest, a number of locations are identified based on the bend of the hills and valleys of the surface micro structure of the paper artifact from the topographic pattern image captured. After identifying various locations, next step (108) is to generate a bit map of the identified locations. The method also includes a step of printing the generated bit map either on top of the region of interest or in any other location on the paper artifact. The method also includes a step of printing a barcode on the region of interest. The barcode may include additional information about the product or document or object which is part of the paper artifact. For example when the paper artifact is used for packing a product then the barcode may include information about the product or any encryption or decryption key required for the encoding device to read the bit map printed on the paper artifact.

According to an embodiment of the invention, the bit map may be printed with an ink, wherein the ink is visible only in a particular wavelength.

Figure 2:
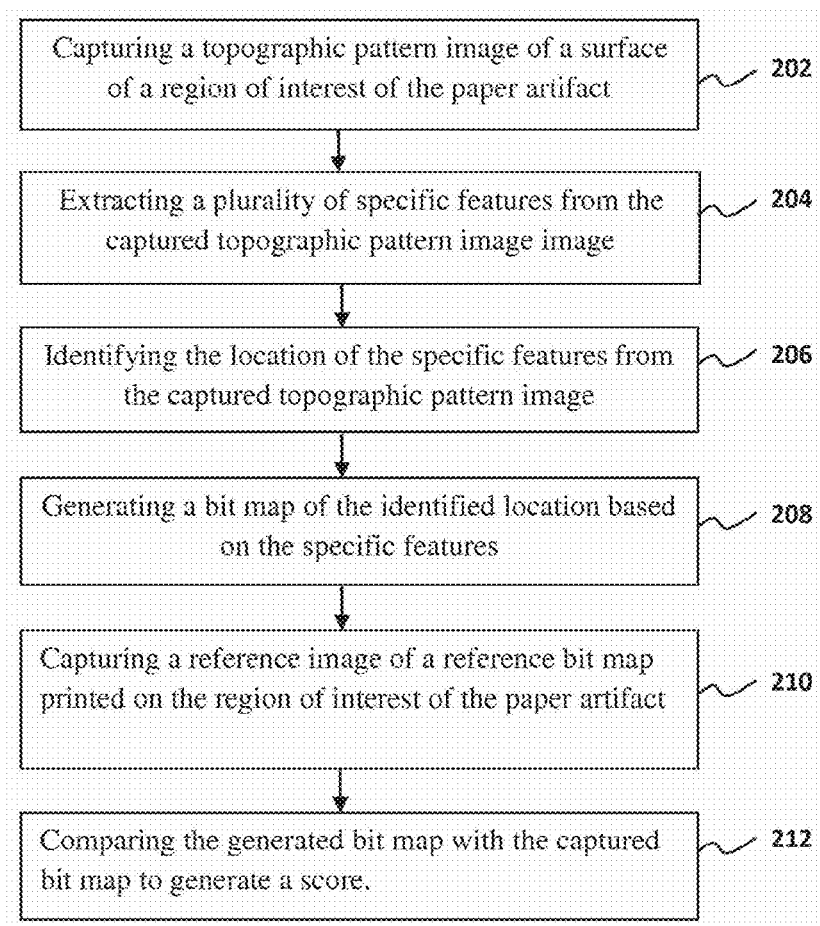
FIG. 2 illustrates a flow chart for the method of authenticating a paper artifact, in accordance with an embodiment of the invention.

According to another embodiment, the invention discloses a method of authenticating a paper artifact. FIG. 2 illustrates a flow chart for the method of authenticating a paper artifact. The method includes step (202) of capturing a topographic pattern image of a region of interest of the paper artifact. The region of interest may be marked for easy identification of the region of interest. Once the topographic pattern is captured, the next step (204) is of extracting a plurality of specific features from the captured topographic pattern image. The specific features are based on the bends of hills, valleys of the surface microstructure of the paper artifact. Once the specific features are identified, next step (206) is to identify the location of the specific features from the captured topographic pattern image. And in the next step (208) a bit map is generated for the identified locations of the specific features. The location may be the point of bend of the hill or valley of the surface texture pattern. Once the bit map is generated then in the further step (210) the reference bit map image present in the region of interest is captured and the method has a another step (212) of comparing the generated bit map with the reference bit map captured from the region of interest of the paper artifact. The comparison of the generated bit map with respect to the reference bit map captured from the region of interest provides a score as a percentage of matching of features and a noise level. The authentication of the object is determined based on the score values. For example, if the score value is more than 80% then the object is an authentic one, the level of authentication decreases as the score lowers. The actual thresholds to determine authenticity are obtained through the statistical processing of a large number of known samples.

According to an embodiment of the invention, the image of the reference bit map and the topographic pattern of the paper artifact is captured by means of light of different wave lengths. This is to get a clear image of the topographic pattern of the paper artifact.

The method as described above include a series of steps and their order of execution in the embodiments of the invention illustrated and described herein is not essential, unless otherwise specified. That is, the steps may be performed in any order, unless otherwise specified, and embodiments of the invention may include additional or fewer steps than those disclosed herein. It may be envisioned that executing or performing a particular step before, contemporaneously with, or after another step is within the scope of the invention. Especially in the method of authenticating a paper artifact it is very much possible to have the step of generation bit map for the region of interest after capturing the bit map image in the region of interest.

Figure 3A:
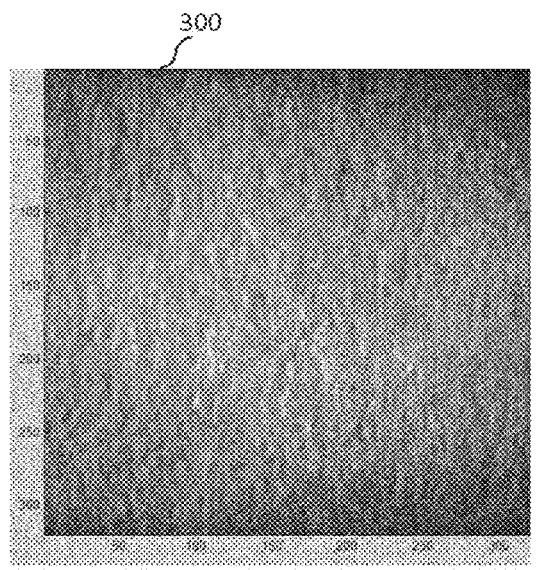
FIG. 3a illustrates the topographic image captured, in accordance with an embodiment of the invention.
Figure 3B:
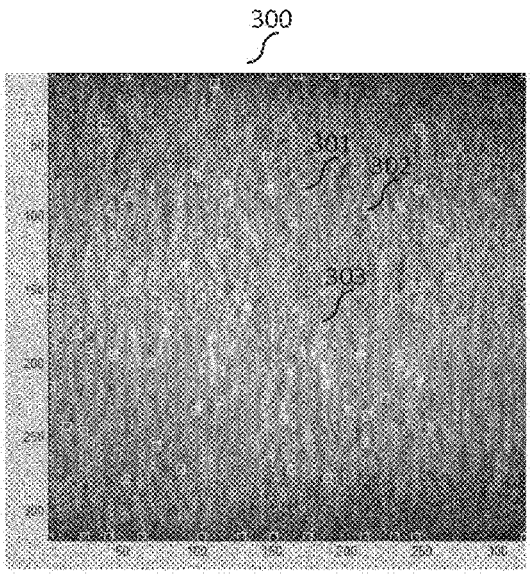
FIG. 3b illustrates the topographic image along with the location identified based on the specific features, in accordance with an embodiment of the invention.
Figure 4A:
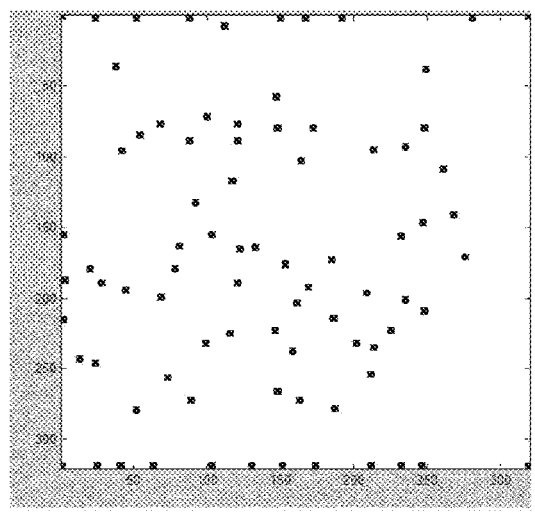
FIG. 4a illustrates a bit map generated based on the locations identified from the specific features, in accordance with an embodiment of the invention.
Figure 4B:
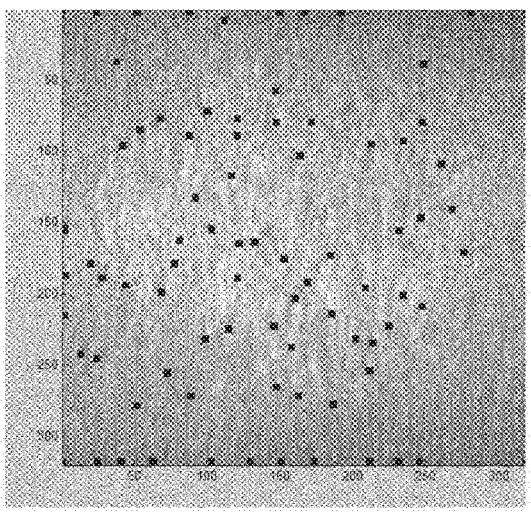
FIG. 4b illustrates the bit map printed directly on top of the surface of region of interest, in accordance with an embodiment of the invention.

FIG. 3a illustrates the topographic pattern image (300) captured, in accordance with an embodiment of the invention and FIG. 3b illustrates the topographic image along with the location identified based on the specific features. The locations are marked using while squares inside the topographic pattern image (300). Numerous numbers of locations are identified wherein a location (301), a location (302), and a location (303) are few of such locations. A bit map is generated based on the locations identified as shown in FIG. 4a. The bit map is generated avoiding the edges of the paper artifact region of interest. After this, the generated bit map on the region of interest of the paper artifact as illustrated in FIG. 4b. Here, each bit of the bit map is printed exactly on top of the location of the specific feature.

FIG. 5a illustrates a region of the paper artifact with a bit map printed on the surface. The method for authentication captures the bit map reference image in visible light to get a reference bit map image as illustrated in FIG. 5b. In the next step the method again captures the topographic image as in FIG. 3a using suitable wavelength of light so that the printed bit map is not visible. From the captured topographic image a bit map is generated as discussed in the method of generating an authentication mark using the specific features and location of the specific features. After generating a bit map a comparison is performed as illustrated in FIGS. 6a and 6b to compare each bit of the captured reference bit map image and the generated bit map. A score is generated based on the bit wise comparison. The authentication of a paper artifact is determined based on the score of comparison, higher the score of comparison the paper artifact is more authentic. Thresholds are determined by statistical processing of a large number of known samples.

The present invention provides an offline method of authentication of paper artifact, which may be used for authenticating various article or products or documents. The present invention does not involve storage of topographic pattern image in database. Thus, the method of authentication is cost effective and gives grate accuracy in authentication. The present invention helps in checking the counterfeit to a great extent.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description.

The invention claimed is:

1. A method of generating an authentication mark on a paper artifact, the method comprising:
   scanning a region of interest of the paper artifact to capture a topographic pattern image of the region of interest, the captured topographic pattern image being an image of the surface texture of the paper artifact;
   extracting a plurality of specific topographic features of the surface texture of the paper artifact from the captured topographic pattern image, the specific topographic features being based on shadows cast by fibers in the surface of the paper artifact;
   identifying a location of each of the specific topographic features extracted from the captured topographic pattern image; and
   generating a bit map of the identified locations of the specific topographic features.

2. The method of claim 1, further comprising printing the generated bit map directly on top of the region of interest such that each bit of the bit map that represents one of the identified locations of the specific topographic features is printed exactly on top of that location on the paper artifact.

3. The method of claim 1, further comprising printing a barcode on the region of interest.

4. The method of claim 1, wherein the specific topographic features extracted from the captured topographic pattern image include at least one of hills or valleys of the surface texture of the paper artifact from the captured topographic pattern image.

5. A method of authenticating a paper artifact, the method comprising:
   capturing a topographic pattern image of a region of interest of a surface of the paper artifact, the captured topographic pattern image being an image of the surface texture of the paper artifact;
   extracting a plurality of specific topographic features of the surface texture of the paper artifact from the captured topographic pattern image, the specific topographic features being based on shadows cast by fibers in the surface of the paper artifact;
   identifying a location of each of the specific topographic features extracted from the captured topographic pattern image;
   generating a bit map of the identified locations of the specific topographic features;
   capturing a reference image of a reference bit map that is printed on the paper artifact; and
   comparing the generated bit map with the captured reference bit map to generate a score.

6. The method of claim 5, wherein the authentication is determined based on the score that is generated.

7. The method of claim 5, further comprising scanning a barcode printed on the region of interest.

8. The method of claim 5, wherein the reference image of the reference bitmap and the topographic pattern image are captured using light of different wave lengths, the reference image of the reference bitmap being captured using visible light.

9. The method of claim 1, wherein the paper artifact does not contain any material that was introduced in order to provide topographic features of the surface texture of the paper artifact.

10. The method of claim 1,
wherein the paper artifact is a paper-pulp based product, and
the topographic features of the surface texture of the paper artifact are solely from the paper-pulp, without any material having been added to the paper-pulp in order to provide topographic features of the surface texture of the paper artifact.

11. The method of claim 1, further comprising:
printing the generated bit map directly on top of the region of interest such that each bit of the bit map that represents one of the identified locations of the specific topographic features is printed exactly on top of that location on the paper artifact,
wherein the specific topographic features extracted from the captured topographic pattern image include at least one of hills or valleys of the surface texture of the paper artifact from the captured topographic pattern image.

12. The method of claim 1, wherein the topographic pattern image shows the surface microstructure of the paper artifact.

13. The method of claim 1, wherein the topographic pattern image shows the inherent microstructure of the surface of the paper artifact that is visible when light rays fall on the surface of the paper artifact at an angle.

14. The method of claim 1, wherein the specific topographic features extracted from the captured topographic pattern image are based on bends of hills and valleys of the surface microstructure of the paper artifact.

15. The method of claim 1,
wherein the topographic pattern image shows the inherent microstructure of the surface of the paper artifact that is visible when light rays fall on the surface of the paper artifact at an angle, and
the specific topographic features are extracted based on shadows cast by fibers in the surface of the paper artifact at points of hills and/or valleys in the microstructure of the surface of the paper artifact.

16. The method of claim 2, further comprising printing the generated bit map in unencrypted form on the paper artifact.

17. The method of claim 5, wherein the reference bit map is printed directly on top of the region of interest such that each bit of the bit map that represents one of the identified locations of the specific topographic features is printed exactly on top of that location on the paper artifact.

18. The method of claim 5, wherein comparing the generated bit map with the captured reference bit map comprises performing a bit wise comparison directly between the generated bit map and the captured reference image of the reference bit map.

19. The method of claim 5, wherein the specific topographic features extracted from the captured topographic pattern image are based on bends of hills and valleys of the surface microstructure of the paper artifact.

20. A method of generating an authentication mark on a paper artifact, the method comprising:
capturing a topographic pattern image of a region of interest of a surface of the paper artifact, the captured topographic pattern image being an image of the topographic pattern on the surface of the paper artifact;
extracting a plurality of specific topographic features of the topographic pattern on the surface of the paper artifact from the captured topographic pattern image, the specific topographic features being based on shadows cast by fibers in the surface of the paper artifact;
identifying a location of each of the specific topographic features extracted from the captured topographic pattern image; and
generating a bit map of the identified locations of the specific topographic features.

* * * * *